(12) United States Patent
Chin et al.

(10) Patent No.: US 11,861,593 B1
(45) Date of Patent: Jan. 2, 2024

(54) PAYMENT VEHICLE RECYCLING SYSTEM AND METHOD

(71) Applicant: Wells Fargo Bank, N.A., San Francisco, CA (US)

(72) Inventors: Marina M. Chin, San Francisco, CA (US); Kristine Ing Kushner, Orinda, CA (US); Paul Vittimberga, Oakland, CA (US); John Wright, Benicia, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 306 days.

(21) Appl. No.: 15/868,851

(22) Filed: Jan. 11, 2018

(51) Int. Cl.
*G06Q 20/34* (2012.01)

(52) U.S. Cl.
CPC .................. *G06Q 20/354* (2013.01)

(58) Field of Classification Search
CPC ...................................... G06Q 20/354
USPC .......................................... 705/41
See application file for complete search history.

(56) References Cited

U.S. PATENT DOCUMENTS

| | | | |
|---|---|---|---|
| 6,089,611 A | 7/2000 | Blank | |
| 6,555,213 B1 | 4/2003 | Koneripalli et al. | |
| 7,246,752 B2 | 7/2007 | Brown | |
| 7,398,557 B2 * | 7/2008 | de Jong | G06F 21/335 380/201 |
| 7,584,153 B2 * | 9/2009 | Brown | G07F 7/1083 235/380 |
| 7,690,580 B2 | 4/2010 | Shoemaker | |
| 8,245,959 B1 * | 8/2012 | Black | G06Q 20/354 241/30 |
| 9,251,458 B2 | 2/2016 | Finn et al. | |
| 9,665,747 B1 | 5/2017 | Ogram | |
| 9,922,371 B1 * | 3/2018 | Bailey | G06Q 30/0226 |
| 2003/0178494 A1 * | 9/2003 | Abe | G06K 13/08 235/475 |
| 2004/0049455 A1 * | 3/2004 | Mohsenzadeh | G06Q 20/00 705/40 |
| 2004/0111348 A1 * | 6/2004 | Greene | G06Q 20/355 705/36 R |
| 2004/0139207 A1 * | 7/2004 | de Jong | H04L 9/3271 709/229 |
| 2005/0051633 A1 | 3/2005 | Lasch et al. | |
| 2006/0292946 A1 | 12/2006 | Kiekhaefer | |
| 2007/0017973 A1 | 1/2007 | Blank et al. | |
| 2007/0057052 A1 | 3/2007 | Goldstein et al. | |
| 2007/0208671 A1 * | 9/2007 | Brown | G06Q 20/341 705/65 |
| 2007/0241183 A1 | 10/2007 | Brown et al. | |
| 2007/0244709 A1 * | 10/2007 | Gilbert | G06Q 10/30 705/308 |

(Continued)

FOREIGN PATENT DOCUMENTS

WO WO-2011115492 A1 * 9/2011 ....... G06K 19/06187

OTHER PUBLICATIONS

Wittmann EG, Zarger CA, "Unattended Computer Physical Security System", IBM TDB Archive, Jan. 2, 1989 (Year: 1989).*

(Continued)

*Primary Examiner* — Daniel S Felten
*Assistant Examiner* — Kevin T Poe
(74) *Attorney, Agent, or Firm* — Foley & Lardner LLP (57) ABSTRACT

A method of updating a payment card includes receiving a payment card having an existing payment part. The method includes removing the existing payment part from the payment card and installing a new payment part with the payment card for subsequent use of the payment card.

5 Claims, 6 Drawing Sheets

(56) References Cited

U.S. PATENT DOCUMENTS

| | | | |
|---|---|---|---|
| 2008/0011832 A1* | 1/2008 | Chang | G07F 11/02 |
| | | | 235/381 |
| 2008/0086411 A1 | 4/2008 | Olson et al. | |
| 2009/0045255 A1* | 2/2009 | Adams | G07F 17/42 |
| | | | 235/375 |
| 2009/0184168 A1 | 7/2009 | Ricketts et al. | |
| 2011/0084148 A1 | 4/2011 | Ricketts et al. | |
| 2011/0139332 A1* | 6/2011 | Gilbert | B32B 27/06 |
| | | | 156/62.2 |
| 2014/0279476 A1* | 9/2014 | Hua | G06Q 20/227 |
| | | | 705/41 |
| 2015/0178616 A1 | 6/2015 | Blum | |
| 2015/0220921 A1 | 8/2015 | Dent et al. | |
| 2015/0302410 A1* | 10/2015 | Lacoss-Arnold | G06Q 20/354 |
| | | | 705/44 |
| 2017/0046611 A1 | 2/2017 | Stern et al. | |
| 2017/0087758 A1 | 3/2017 | Valdmaa et al. | |
| 2017/0106572 A1 | 4/2017 | Cepress et al. | |
| 2017/0244746 A1* | 8/2017 | Hawthorn | H04L 63/1433 |
| 2017/0344869 A1 | 11/2017 | Williams et al. | |
| 2017/0344870 A1 | 11/2017 | Williams et al. | |
| 2018/0137577 A1* | 5/2018 | Niderberg | H04W 4/021 |
| 2018/0285857 A1* | 10/2018 | Yang | G06K 7/1413 |
| 2018/0365682 A1* | 12/2018 | Ball | G06Q 20/341 |

OTHER PUBLICATIONS

"Method to detect defective magnetic strip on payment card" Jun. 18, 2012 (Year: 2012).*

* cited by examiner

PAYMENT VEHICLE RECYCLING SYSTEM AND METHOD

TECHNICAL FIELD

Embodiments of the present disclosure relate to replacing and installing payment parts with payment vehicles.

BACKGROUND

Payment vehicles, such as a payment card, typically carry payment parts that store data to associate the payment card with a user's account to thereby enable purchases or transactions. A magnetic stripe and an integrated circuit chip are among various possible types of payment parts that may be included with the payment vehicle. Over time, the payment parts may become damaged or obsolete, or the data they store may be compromised, which traditionally requires that the entire payment vehicle be destroyed and replaced.

SUMMARY

A first example embodiment relates to a method of updating a payment vehicle. The method includes receiving a payment vehicle having an existing payment part. The method also includes removing the existing payment part from the payment vehicle and installing a new payment part with the payment vehicle.

Another example embodiment relates to an apparatus. The apparatus includes an assessment and planning circuit to receive data indicating one or more characteristics of a payment vehicle having an existing payment part, determine the existing payment part for removal from the payment vehicle, and determine a new payment part for installation with the payment vehicle. The apparatus also includes an automation controls circuit to facilitate removal of the existing payment part from the payment vehicle and facilitate installation of the new payment part with the payment vehicle.

Another example embodiment relates to a payment vehicle recycler system. The payment vehicle recycler system includes a receptacle and a processing system. The receptacle is configured to receive a payment vehicle having an existing payment part. The processing system is communicably coupled to the receptacle and is configured to receive data related to data received by the receptacle, determine the existing payment part for removal from the payment vehicle based on the data. determine a new payment part for installation with the payment vehicle, generate a signal to control mechanisms to remove the existing payment part from the payment vehicle, and generate a signal to control the mechanisms to install the new payment part with the payment vehicle.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of, methods, apparatuses, and systems for a payment card recycling system. The various concepts introduced above and discussed in greater detail below may be implemented in a variety of ways, as the concepts described are not limited to any particular manner of implementation. Examples of specific implementations and applications are provided primarily for illustrative purposes.

A payment vehicle is an object that can be used by a customer to make a purchase/perform a transaction. A payment vehicle includes (e.g., contains, carries, is coupled to) one or more payment parts. Payment parts are components included with payment vehicles that are encoded with customer account information and/or other data that can be used to facilitate and/or enable a transaction (e.g., a payment using the payment vehicle). Accordingly, a payment vehicle may include, but is not limited to, a credit card, a debit card, a prepaid card, and the like. In this regard, the terms "payment card" or "transaction card" are used interchangeably herein to refer any one or more of a credit card or debit card. Therefore, in operation, to make a purchase for an amount of money, a credit card can be presented to a payment parts reader device operated by a merchant, which reads information from the credit card's payment parts to enable and/or facilitate the transaction.

Figure 1:
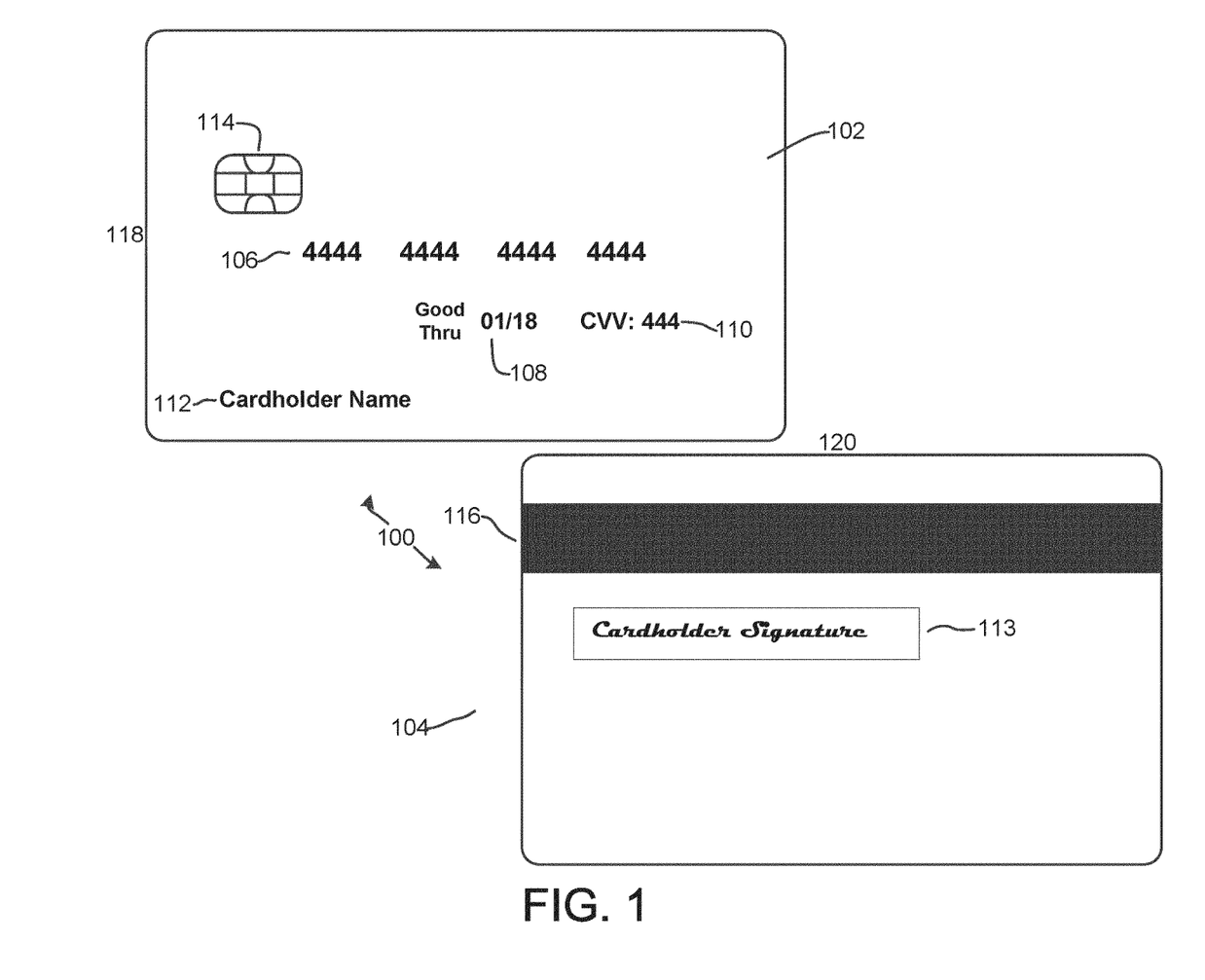
FIG. 1 is a depiction of a payment vehicle, according to an example embodiment.

A common form of a payment vehicle is a transaction card, for example as depicted in FIG. 1 and described in detail below, but a payment vehicle may alternatively be in the form of a bracelet, a pendant, a ring, a keychain, a cellphone or mobile device, an implant, or other item configured to carry or include one or more payment parts. Therefore, it should be understood that while the bulk of the disclosure contained herein describe payment vehicles as a transaction or payment card (e.g., a credit card), this explanation and description is not meant to be limiting as the systems, methods, and apparatuses described herein may also be applicable with other alternative types of payment vehicles.

With reference to payment vehicles being configured as a transaction card, the transaction card may include bespoke designs, and may be manufactured from luxury materials. In such cases, destruction and replacement of the entire transaction card may not be a good option when the payment parts become compromised, damaged, or obsolete. Additionally, current transaction card manufacturing processes typically require that payment parts be installed during the manufacture of the transaction card, generally resulting in mass production of transaction card and limiting the availability of transaction card with bespoke designs and luxury materials. The present disclosure provides a technical advantage over these shortcomings by enabling a user to retain the body of their transaction card, while the payment parts are recycled thereby allowing continued use of their desired bespoke transaction card. Such a system and method may be appealing to consumers who often replace their expensive bespoke transaction cards each time the transaction card expires, which is often a time-consuming and tedious process. These and other features and benefits of the present disclosure are described more fully herein below.

Referring now to FIG. 1, front and back views of a transaction card 100 are shown, according to an example embodiment. As mentioned above, transaction card 100 is one embodiment of a payment vehicle and includes payment parts and customer account information. In the example depicted, the transaction card 100 is configured or structured as a credit card. As such, transaction card 100 or credit card 100 may be used interchangeably herein. Transaction card 100 can be used with commercially available card readers to make purchases from merchants, and in some embodiments can also be used with an ATM to make a cash withdrawal or access other functions related to a cardholder's customer account.

Transaction card 100 has a front face 102 and a back face 104. In this example, the transaction card 100 is substantially rectangular; of course, in other embodiments, a variety of other shapes and sizes may be implemented the transaction card 100. The front face 102 includes printed information relating to a customer's account information, including a card number 106, an expiration date 108, a card verification value (CVV) 110, and a cardholder name 112. In alternative embodiments, some or all of this information 106-112 is printed on back face 104, depicted with characters formed by protrusions from the front face 102 or back face 104, presented on an electronic display coupled to the transaction card 100, or not presented on the transaction card 100 at all. Back face 104 includes a cardholder signature box 113 that allows a customer to affix a signature to the card using a standard writing utensil.

Transaction card 100 includes payment parts. In this example, the payment parts are shown to include an integrated circuit device ("chip") 114 and magnetic stripe ("magstripe") 116. In other embodiments, other types of payment parts such as a radio frequency identification (RFID) device (e.g., a near field communication interface) may be included with a payment vehicle, which facilitates and enables contactless payments. As shown in FIG. 1, the chip 114 is located on the front face 102 of the transaction card 100, positioned near a first side 118 of the transaction card 100. The magstripe 116 is substantially rectangular and positioned parallel and proximate to a top edge 120 of the transaction card 100. The size and shape of the transaction card 100 and the position of the chip 114 and the magstripe 116 may thereby be configured to comply with one or more standards/regulations, such as international standards such as ISO/IEC standards 7810, 7811, and 7816 and to interface with commercially-available card readers. For example, transaction card 100 has dimensions of 85.60 millimeters by 53.98 millimeters (3⅜ inches by 2⅛ inches) with rounded corners of radius between 2.88 millimeters and 3.48 millimeters and a thickness of 0.76 millimeters (1/32 inch) to conform to ISO/IEC 7810.

The chip 114 is set into a chip pocket recessed into the front face 102 of the transaction card 100, and may be held into place with an adhesive such as glue or epoxy. Of course, in other embodiments, different and/or additional coupling methods of the chip 114 to the chip pocket may be utilized.

The magstripe 116 is similarly set into a groove recessed into the back face 104, and may be held into place with an adhesive such as glue or epoxy. In other embodiments, different and/or additional coupling methods of the magstripe 116 to the groove may be utilized (e.g., the body of the card may overlap the magstripe to retain the magstripe, etc.). The back face 104 and the magstripe 116 may also be covered with a continuous layer of lamination.

The magstripe 116 may be made substantially of magnetic material and may be configured to store data. Data storage in the magstripe may be based on the pattern of magnetic polarization directions of portions of the magstripe 116. This data may be read using a standard magstripe reader. The data stored on the magstripe 116 may be encoded or altered using a standard magstripe encoder that alters the magnetic polarization of portions of the magstripe 116. The magstripe 116 may store information relating to a customer's account, which often includes some or all of the information printed on front face 102 such as the card number and the customer's name.

The chip 114 may be an integrated circuit device that stores encrypted data relating to a customer's account using binary data written in the integrated circuit. In some embodiments, the chip 114 may comprise gold-plated contact pads that provide electronic connectivity between the chip and a standard card reader or card writer as well as other standardized features provided by ISO/IEC 7810 and 7816, or later developed standards. In other embodiments, the chip 114 may be configured to transmit information without contacting a card reader, and may include an inductor to capture a radio-frequency signal, a near-field communication signal, or a Bluetooth signal and use it to power electronic elements in the chip 114. This configuration was alluded to above with respect to the RFID device. In the embodiment described, the RFID device or other wireless transmitting technology may be included with the chip 114 (in other embodiments, this technology may be a separate component relative to the chip 114). The chip may then conform to ISO/IEC 14443-4. The chip 114 may or may not conform to specifications maintained by EMVCo or other private standard-setting organizations. Data stored on the chip 114 may be encrypted such that it can be accessed by the input of a pin or other encryption key. The chip 114 may also be configured to prevent the writing of data to the chip or deletion of data on the chip absent a security key or token provided by a data encoder.

Due to advancements in payment parts technology, physical damage to or electronic corruption of payment parts, theft of customer account information as stored on the payment parts, or various other debilitating occurrences may render the payment parts on transaction card 100 obsolete or unusable. Traditionally, transaction card 100 in its entirety must be destroyed by the customer and replaced with a new payment vehicle with updated payment parts. However, as described in detail below in reference to FIGS. 2-6, payment parts such as chip 114 and magstripe 116 may instead be replaced to allow the transaction card 100 to be reused.

Traditionally, the transaction card 100, the chip 114, and the magstripe 116 are mass manufactured. Payment vehicles such as transaction card 100 may also be personalized for a customer to include images or designs particular to that user, or be may offered in limited edition configurations by fashion designers. Payment vehicles such as transaction card 100 are generally manufactured from plastic, but may also include luxury materials such as metals or jewels. These bespoke, luxury, or designer cards may be produced by individual or small-scale artists and designers or by jewelry companies or other entities that traditionally do not manufacture, encode, or distribute payment parts for payment vehicles. The system disclosed below with reference to FIGS. 2-6 provide for payment parts installation on blank payment vehicles, such as those produced outside of traditional transaction card manufacturing companies.

Payment vehicles also take different forms, shapes, or designs than that of transaction card 100 shown in FIG. 1. For example, a payment vehicle may be a ring, necklace, or bracelet with antenna on the outer part of the torus of the ring, necklace, or bracelet. A hole in the torus allows for the chip assembly to snap in (and glue) from below, and mate to the antenna. In some embodiments, the payment vehicle is a ring or bracelet with prong jewelry, and one of the prong sets holds the chip assembly. The chip assembly and/or antenna may enable payments from the ring, neck, or bracelet. Thus, the chip assembly and/or antenna may include network interface capabilities to facilitate such payments (e.g., a NFC chip that transmits payment credentials, such as a token, from the ring or bracelet, to a point of sale reader). Thus, while the bulk of the description contained herein with respect to the payment vehicle being a transaction card is not meant to be limiting.

Figure 2:
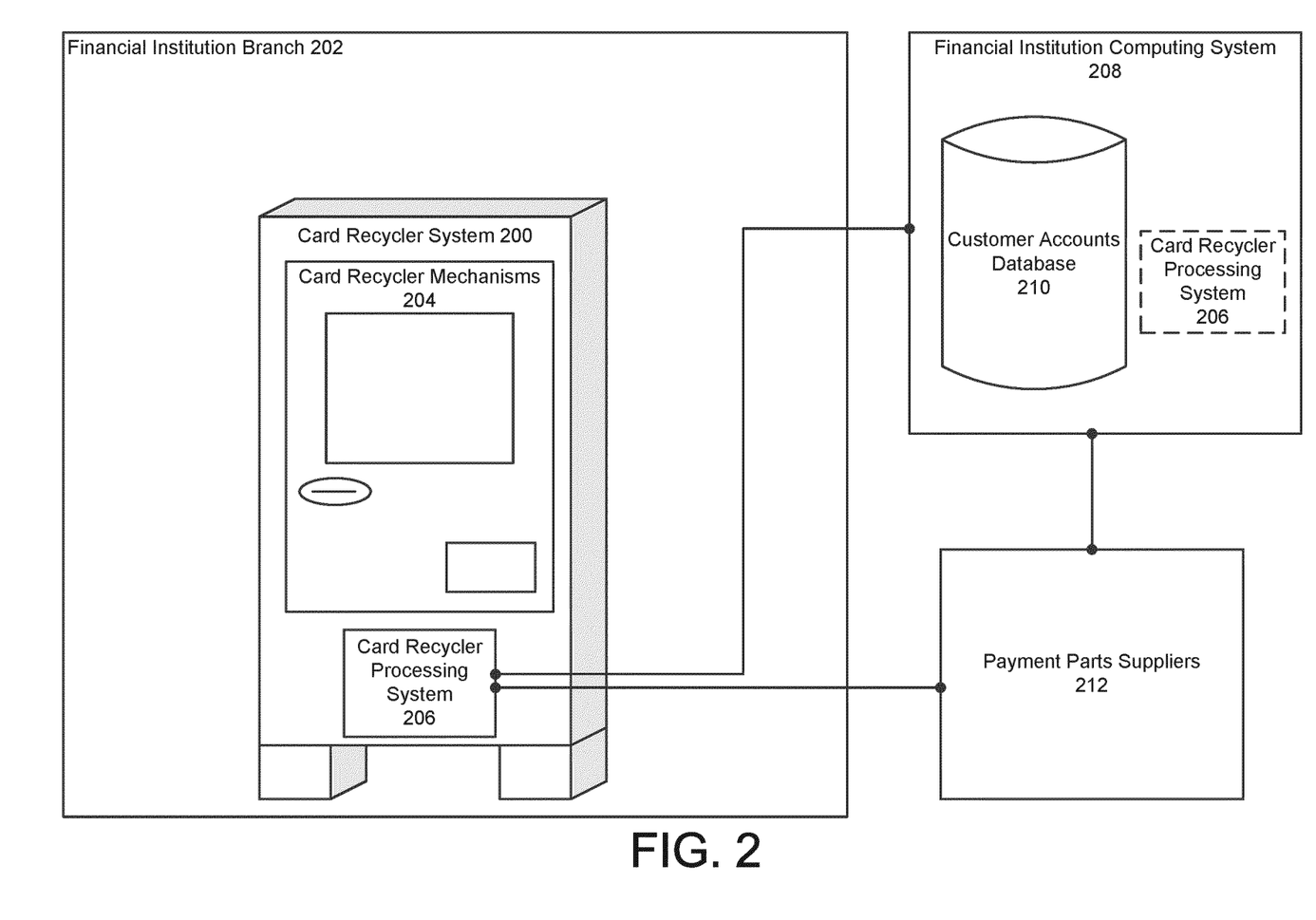
FIG. 2 is a block diagram of a card recycler system in a financial institution branch, according to an example embodiment.

Referring now to FIG. 2, a block diagram of a financial institution with a card recycler system is shown, according to an example embodiment. In this example, the card recycler system 200 is located at a financial institution branch 202. In other embodiments, the card recycler system 200 may be disposed in other locations and/or unaffiliated with the financial institution (e.g., maintained and operated by a third party). As shown, the card recycler system 200 includes card recycler mechanisms 204 and a card recycler processing system 206, and is coupled to a financial institution computing system 208, and payment parts supplier 212. Each of these components is described below.

Payment parts suppliers 212 is configured to provide an inventory of new payment parts to the card recycler system 200. Thus, the payment parts suppliers 212 may be manufacturers or sellers of payments parts. The suppliers 212 may store various information electronically (e.g., type of payments parts current in inventory, how fast they can be shipped to certain locations, cost of these parts, and all other information pertaining to payment parts). The payment parts suppliers 212 are communicatively coupled with the card recycler system 200 and/or the financial institution computing system 208 to share information about orders, inventory, shipping, security keys or encryption features, or other relevant information.

The financial institution computing system 208 manages and stores data relevant to the operation of a financial institution, such as customer account information and financial data. Thus, the financial institution computing system 208 may be owned, associated with, or otherwise managed or operated by a financial institution. A financial institution may include a banking institution, a lending institution, a transaction processing institution (e.g., an issuer, an acquirer, etc.), and/or some combination thereof. The financial institution computing system 208 includes customer accounts database 210 that stores information relating to customer accounts such as customer names, customer billing addresses, account numbers, expiration dates, card verification values, other account security keys, account balances or credit limits, order information for new cards, or any other information related to a customer's account. The financial institutional computing system 208 and the customer accounts database 210 are communicably coupled to the card recycler system 200, including card recycler mechanisms 204 and card recycler processing system 206, to allow for the sharing of customer account information and other relevant information with the card recycler system 200.

In general, the card recycler system 200 is configured to receive a payment vehicle having an existing payment part, remove the existing payment part from the payment vehicle, and install a new payment part with the payment vehicle. As shown, the card recycler system 200 is positioned in a financial institution branch 202, where it can be used directly by a customer or by an employee of the financial institution. As mentioned above, the card recycler system 200 may also be located in any other suitable location, such as a department store or shopping mall. The functions and components of the card recycler system are described in detail below.

The card recycler system 200 includes card recycler mechanisms 204 configured to allow card recycler system 200 to accept, physically modify, and dispense a customer's payment vehicle. As described in detail below with reference to FIGS. 3-6, the card recycler mechanisms include a series of tools, mechanisms, and sensors suitable to collect data about a payment vehicle, remove existing payment parts from the payment vehicle, and install a new payment part with the payment vehicle.

The card recycler processing system 206 is configured to collect data relating to a payment vehicle received by the card recycling system, determine an existing payment part for removal from the payment vehicle, determine a new payment part for installation with the payment vehicle, to control mechanisms to remove the existing payment part from the payment vehicle, and to install the new payment part with the payment vehicle. The card recycler processing system 206 may alternatively be housed locally within the card recycler system 200 or may be located remotely within financial institution computing system 208, as shown. As described in detail below with reference to FIG. 3-6, the card recycling system includes a combination of circuits structured to provide the data analysis, planning, and automation controls necessary to allow the card recycler system to receive a payment vehicle having an existing payment part, remove the existing payment part from the payment vehicle, and install a new payment part with the payment vehicle.

Figure 3:
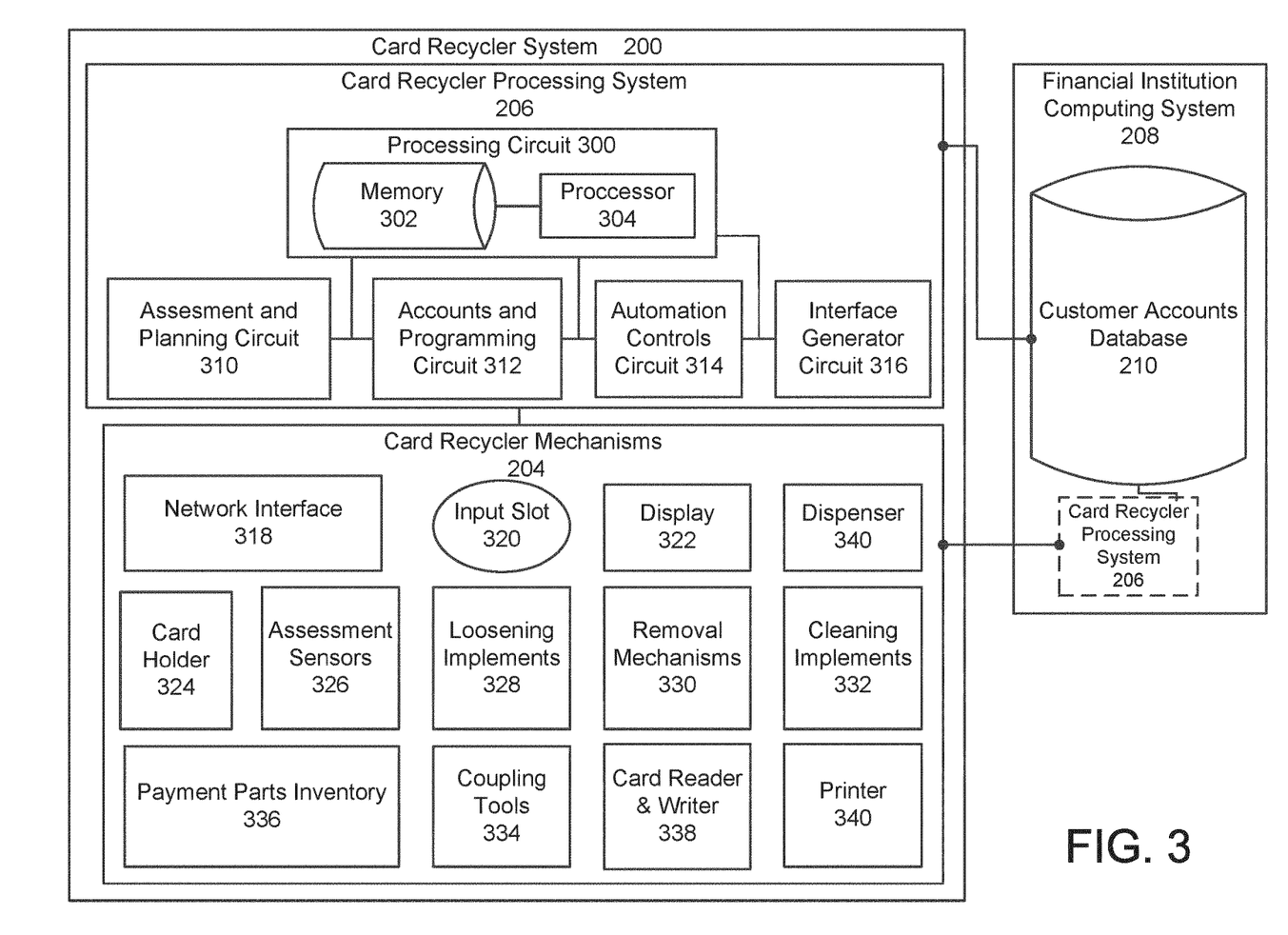
FIG. 3 is a detailed block diagram of the card recycler system of FIG. 2 with a card recycler processing system and various card recycler mechanisms, according to an example embodiment.

Referring now to FIG. 3, a detailed view of the card recycler system 200 of FIG. 2 is shown, according to an example embodiment. The card recycler system 200 is an example of a payment vehicle recycler system. The card recycler system 200 includes the card recycler mechanisms 204 and card recycler processing system 206, and is coupled to financial institution computing system 208. The card recycler processing system 206 may be located within the card recycler system, in a financial institution computing system 208, or some combination of the two. For clarity, FIG. 3 shows components of card recycler processing system 206 within card recycler system 200, but any or all of these components may be located in the financial institution computing system 208.

The card recycler processing system 206 includes a processing circuit 300, which includes memory 302 and a processor 304, as well as an assessment and planning circuit 310, an accounts and programming circuit 312, and automation controls circuit 314, and an interface generator 316. The processor 304 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 302 (e.g., RAM, ROM, NVRAM, Flash Memory, hard disk storage, etc.) may store data and/or computer code for facilitating at least some of the various processes described herein. In this regard, the memory 302 may store programming logic that, when executed by the processor 304, control the operation of the card recycler processing system 206.

A variety of circuits including an assessment and planning circuit 310, an accounts and programming circuit 312, an automation controls circuit 314, and an interface generator circuit 316 are configured to receive data from and provide controls instructions to the card recycler mechanisms 204 as described in detail below. While various circuits with particular functionality are shown in FIG. 3, it should be understood that card recycler processing system 206 may include any number of circuits, interfaces, and logic for completing the functions described herein. For example, the activities of multiple circuits may be combined as a single circuit, as additional circuits with additional functionality may be included, etc.

Card recycler system 200 includes card recycler mechanisms 204 that allow the card recycler system 200 to accept, physically modify, and dispense a customer's payment vehicle. The card recycler mechanisms 204 are housed within the card recycling system 200, communicably coupled to the card recycler processing system 206, and include a network interface 218, an input slot 320, a display 322, a card holder 324, assessment sensors 326, loosening implements 328, removal mechanisms 330, cleaning implements 332, payment parts inventory 336, coupling tools 334, a card reader and writer 338, a printer 340, and a dispenser 342.

The network interface 318 is provided to facilitate electronic communication between the card recycler mechanisms 204, the card recycler processing system 206, and the financial institution computing system 208. The network interface 318 includes any of a cellular transceiver (e.g., CDMA, GSM, LTE, etc.), a wireless network transceiver (e.g., 802.11X, ZigBee, Bluetooth, etc.), a wired network interface (e.g., Ethernet), or a combination thereof (e.g., both a cellular transceiver and a Bluetooth transceiver). Further, the network interface 318 may include cryptography capabilities to establish a secure or relatively secure communication session with the card recycler processing system 206 and the financial institution computing system 208. In this regard, data may be encrypted to prevent or substantially prevent the threat of hacking.

Card recycler mechanisms 204 also include input slot 320 configured to accept or otherwise receive a payment vehicle such as transaction card 100 input by a customer. Input slot 320 may be configured to accept transaction cards meeting a standard size and shape within a preset tolerance, or may be configured to accept a variety of payment vehicle configurations. Input slot 320 may be coupled to the automation and controls circuit 314 to provide an indication that a payment vehicle has been inserted and to receive instructions to accept the payment vehicle by pulling the payment vehicle into the recycler system 200. In some embodiments, input slot 320 is also configured to receive new payment parts from the customer to be installed on the payment vehicle.

Display 322 is configured to present a user interface that is generated by the interface generator circuit 316. The interface generator circuit 316 generates a graphical user interface for presentation on display 322 that may prompt and accept input related to a customer's account information, a customer's security pin or password, a customer's instructions to the card recycler system 200, or other options or instructions for the card recycler system 200. Input may be based on touch-screen technology in display 322, or a separate input device may be included. Customer input is electronically communicated from the display to the interface generator circuit 316 where it can be interpreted and communicated to other circuits 310-314 in the card recycler processing system 206 as needed. In some embodiments, the interface generator circuit 316 may generate a user interface accessed by a user on a personal computer or mobile device, for example via an internet browser or smartphone app. Notifications and updates may be sent to the user's computer or mobile device regarding a need to recycle a payment vehicle, order status related to new payment parts, real-time updates about payment vehicle recycling while the customer's payment vehicle is received by the card recycling mechanisms 204, and other relevant updates. Customer input may also be provided to the card recycler processing system 206 via a personal computer or mobile device. The customer's mobile device may be used as part of a multi-factor authentication process to verify a request to recycle a payment vehicle, which may also include prompts or input provided via display 322.

Card holder 324 is configured to receive an inputted payment vehicle from the input slot 320 and grip, carry, support, suspend, or otherwise secure the payment vehicle for automated manipulation within card recycler system 200. Card holder 324 receives controls instructions from the automation controls circuit 314 and may provide feedback data to the automation controls circuit 314.

Card holder 324 aligns the payment vehicle with assessment sensors 326. Assessment sensors 326 are configured or structured as one or more devices configured to measure, capture images of, or otherwise generate and acquire data about a payment vehicle. Therefore, assessment sensors 326 may include a card reader for reading information off payment parts on the transaction card, such as a chip or magstripe. Additionally, assessment sensors 326 may also include sensors configured to collect raw data relating to the location of payment parts with relation to the payment vehicle, the physical condition of the payment parts, the material of the payment vehicle, or other physical attributes of the payment vehicle. For example, assessment sensors 326 may include, but are not limited to, a camera, a laser-based distance meter, an ultrasonic sensor, and digital calipers. Thus, the sensors may acquire information regarding the size of the payment parts and card itself, the location of the payment parts with respect to the card, degradation information (e.g., scratches, bends, and the like disposed on the card), characteristics of the card (e.g., thickness, material used to construct the card, etc.), and characteristics of the payment parts (e.g., type such as a chip or magstripe, version information such as when these parts were implemented with the industry, etc.).

Raw data collected by assessment sensors 326 is transmitted to the assessment and planning circuit 310 within the card recycler processing system 206 for processing and assessment. The assessment and planning circuit 310 may also communicate with the memory 302 or other element of the financial institution computing system 208 to access a list providing information of payment parts attributes that signal a need to replace those payment parts, or to access customer-specific information in the customer accounts database 210 relating to payment parts status. The assessment and planning circuit 310 is configured to use the raw data from the assessment sensors 326 and the list of payment parts attributes and customer account information to determine the physical configuration of the inputted payment vehicle, evaluate the condition of payment parts on the payment vehicle, determine which payment parts need to be added, replaced or reprogramed, and create a plan for adding, replacing, and/or reprogramming those parts. Data analysis may include machine learning, neural networks, image recognition programs, and other approaches to autonomously or semi-autonomously drawing conclusions based on sensor data. In particular, the determination that one or more payment part needs to be removed can be based on applying a library of preset rules to the processed sensor data to determine which payment parts must be removed, for example based on the detection of a predetermined number of scratches on a magstripe, or can be made using a probabilistic modeling approach. The determination can also be based on an indication stored in the customer accounts database 210 that the customer has an obsolete, damaged, or compromised payment part. For example, one determination can be a comparison between a number of scratches detected on a magstripe using image processing of an image captured by a camera included in assessment sensors 326 and a preset number of scratches (e.g., 150) that renders a magstripe worthy of replacement. As another example, a determination can be made based on a measurement of a size, shape, or configuration of a chip that indicates the chip is of a certain model, comparing that model to a list of obsolete chip models that should be replaced, and determining to remove that chip if its model is on the list of obsolete chip models. As another example, the assessment sensors 326 may read data from a payment part and to identify the payment part, and compare that identification to a list stored by the financial institution computing system of payments parts that have been reported as compromised or falsified by fraudsters, and determine to replace the payment part if the payment part is on the list.

If the assessment and planning circuit 310 determines that one or more payment parts needs to be removed as described above, the assessment and planning circuit 310 directs automation controls circuit 314 to send a signal, command, or instruction to the card holder 324 to deliver the payment vehicle to loosening implements 328. Loosening implements 328 are tools or mechanisms configured to loosen the bond between a payment vehicle and a payment part. Loosening implements 328 may include a heating element that can be aligned with at least one of the payment parts to loosen an adhesive that binds payment parts to the payment vehicle. Loosening implements 328 may also include a mechanism for applying a solvent formulated to dissolve an adhesive that binds payment parts to the transaction card or otherwise reduce the binding strength of the adhesive. Under control from the automation controls circuit 314, loosening implements 328 may be applied to the regions of a transaction card containing payment parts determined for removal, or may be generally applied to the entire transaction card. Automation controls circuit provides controls instructions to the loosening implements 328 to reduce the strength of the connection between a payment vehicle and payment parts. Different elements or order of loosening implements 328 are applied based on the assessment and plan generated by the assessment and planning circuit 310.

The card holder 324 then receives instructions from the automation controls circuit 314 to provide the payment vehicle to removal mechanisms 330. Removal mechanisms 330 are tools, implements, and/or mechanisms configured to remove a payment part(s) from the payment vehicle. Removal mechanisms 330 may include a gripper arm with a suction cup or other latching structure that may be attached to a payment part to pull the payment part off of the payment vehicle. Removal mechanisms 330 may also include a scraper, blade, chisel, file or other implement for scraping, cutting, or grinding a payment part off of the payment vehicle. Removal mechanisms 330 are controlled by the automation controls circuit 314 (e.g., via one or more electronic instructions) to remove payment parts as planned by the assessment and planning circuit 310. Removal mechanisms 330 may also include sensors that provide feedback to the automation controls circuit 314. The removal mechanisms 330 may be instructed to direct repeated removal efforts at missed areas or removal-resistant areas by the automation controls circuit 314 based on this feedback signal. The removal mechanisms 330 and the automation controls circuit 314 thereby provide closed-loop, automated removal of payment parts and prevent unnecessary damage to the payment vehicle. In some cases, removal mechanisms 330 are instructed to remove or alter portions of the payment vehicle other than existing payment parts in order to prepare the payment vehicle to receive a new payment part. Removal mechanisms 330 are also configured and instructed to erase, destroy, remove, or obscure visual information printed or otherwise presented on the payment vehicle. Different elements or order of removal mechanisms 330 are applied based on the assessment and plan generated by the assessment and planning circuit 310.

The card holder 324 then receives instructions, signals, commands, or the like from automation controls circuit 314 to provide the payment vehicle to cleaning implements 332. Cleaning implements 332 are one or more tools, mechanisms, or system configured to ensure or substantially ensure full removal of payment parts and old adhesive or other coupling means and prepare the payment vehicle for the application of new payment parts. Cleaning implements 332 may include fans, steam jets, sanders, cleaning wipes, or other tools to remove any unwanted, residual material from an area or areas of a payment vehicle where a new payment part will be adhered. Cleaning implements 332 receive instructions from the automation controls circuit 314 to carry out the cleaning steps, and can include sensors to provide feedback to the automation controls circuit 314. For example, cleaning implements may include a camera that provides a video feed or still images that can be analyzed to determine that an area of the payment vehicle still contains a patch of old adhesive. The cleaning implements 332 may be instructed to direct repeated cleaning efforts at missed areas or inadequately-cleaned areas based on this feedback signal. A closed-loop, automated cleaning process may thereby be provided by cleaning implements 332 and automation controls circuit 314. Different elements or order of cleaning implements 332 are applied based on the assessment and plan generated by the assessment and planning circuit 310.

The card holder 324 then receives instructions to provide the payment vehicle to coupling tools 334. Coupling tools 334 are tools and/or mechanisms configured to cause a payment vehicle to be coupled to a payment part, for example with an adhesive or a fastener. Coupling tools 334 may include a glue nozzle or glue roller to apply an adhesive to the payment vehicle in areas designated for new payment parts. Coupling tools 334 may also apply other primer or preparatory material to the payment vehicle or make any suitable alteration to the payment vehicle to prepare the payment vehicle to receive a new payment part or parts. Coupling tools 334 may access a payment parts inventory 336 to get new payment parts for addition to the transaction card as determined by assessment and planning circuit 310. In some embodiments, payment parts inventory 336 is cataloged by customer account information by accounts and programming circuit 312 to store specific, preprogrammed new payment parts for each customer. The payment parts inventory 336 is then controlled by automation controls circuit 314 to ensure the correct payment parts are provided to the coupling tools 334 as instructed by the accounts and programming circuit 312. In other embodiments, the coupling tools 334 receive standard payment parts from the payment parts inventory 336 that are later programmed by the card recycler system 200. Coupling tools 334 include a suction cup, gripper, roller, or other tool to place a new payment part in its desired position on the payment vehicle. Coupling tools 334 may include a vice or other pressure-application mechanism to hold new payment parts in place until an adhesive or other coupling method secures the payment part substantially permanently. Coupling tools 334 may also be configured to install a layer of material over the payment part to protect a payment part and secure it to the payment vehicle. Coupling tools 334 receive instructions regarding how to carry out the coupling process from automation controls circuit 314. Coupling tools 334 may also include sensors that provide feedback to the automation controls circuit 314 to allow for closed-loop, automated coupling of payment parts to payment vehicles. Different elements or order of coupling tools 334 and the position of new payment parts are chosen based on the assessment and plan generated by the assessment and planning circuit 310.

The card holder 324 is then instructed to provide the payment vehicle to card reader and writer 338. The card reader and writer 338 includes a magstripe reader, a chip reader, and/or another payment part reader configured to read starting encoded data off the payment parts on the transaction card. Initial encoded data is sent to accounts and programming circuit 312 and compared to the customer's account information accessed in the customer accounts databased by accounts and programming circuit 312. The accounts and programming circuit 312 receives customer account information from user input via the display 322 and interface generator circuit 316. The accounts and programming circuit 312 determines whether the initial encoded data must be altered in order to properly associate the transaction card with the customer's account, and, if so, identifies the desired encoded data to be programmed to the payment parts. The desired encoded data is sent to the card reader and writer 338, which includes instruments capable of reprogramming payment parts with the desired encoded data. Where necessary, the card reader and writer 338 may also be provided with a security or decryption key by the accounts and programming circuit to allow it to access and reprogram encrypted payment parts. The card reader and writer 338 can then reprogram the payment parts with the desired encoded data. The card reader and writer 338 checks the reprogramming by reading the data off the payment parts and transmitting it to the accounts and programming circuit 312 to be checked against the desired encoded data. The accounts and programming circuit 312 may use this check to activate the new payment parts for use, for example by sending a verification notification to the customer accounts database 210. The card reader and writer 338 may also be configured to encrypt or lock payment parts so they cannot be reprogrammed or copied without a correct decryption key.

The card holder 324 is then directed to provide the payment vehicle to printer 340. The printer 340 is configured to print any updated customer account information on the payment vehicle, such as a card number or expiration date. The printer 340 may be configured to print updated customer account information and/or a receipt on paper or on a sticker to be provided to a customer separate from the payment vehicle. In some embodiments, the updated information is printed or engraved on insets or an attractive laminate that can be coupled to the payment vehicle in a similar manner as disclosed herein for a chip or a magstripe. In some embodiments, the customer account information may be shared with a customer by the card recycler processing system 206 by sending a notification with the information to a user device (e.g., smartphone, personal computer) via email, smartphone application, or other form of electronic communication. The printer 340 is coupled with the accounts and programming circuit 312 to receive the information to be printed and with the automation controls circuit 314 to receive instructions about where and how to print the information. Different printing options are determined by the assessment and planning circuit 310 and/or through options selected by the customer on display 322 as provided by interface generator circuit 316.

In some embodiments, the card holder 324 is then directed to provide the payment vehicle to assessment sensors 326. The assessment sensors 326 provide assessment sensor data to the assessment and planning circuit 310. The assessment and planning circuit 310 analyzes the assessment sensor data to check that the plan was successfully followed and that the resulting updated payment vehicle is ready to be dispensed to the customer.

The card holder 324 is then directed to provide the payment vehicle to dispenser 342. Dispenser 342 receives the payment vehicle and delivers it to the customer. The dispenser 342 thereby removes the payment vehicle from the card recycler system 200. The dispenser 342 may also be configured to dispense a receipt provided by printer 340. The dispenser 342 may be controlled by instructions from automation controls circuit 314 and may be configured to send feedback signals indicating that the payment vehicle was successfully dispensed to the customer. The card recycler system 200 thereby outputs a payment vehicle with added, updated, and/or reprogrammed payment parts for the customer.

Figure 4:
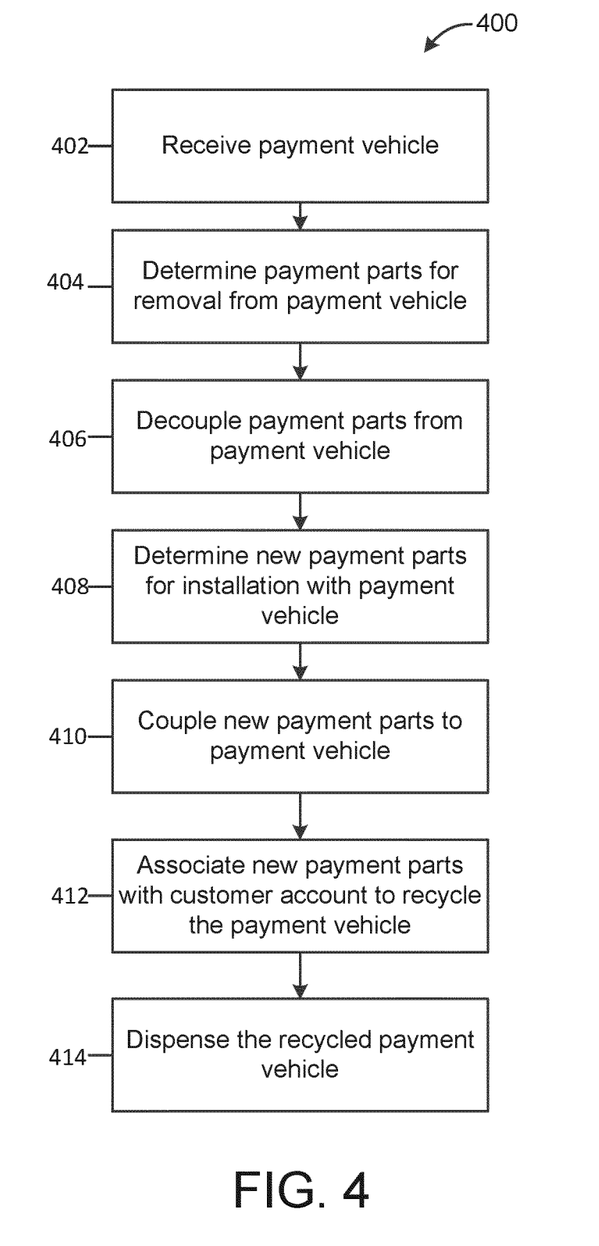
FIG. 4 is a flowchart of a process of recycling a payment vehicle via the card recycler system of FIGS. 2-3, according to an example embodiment.

Referring now to FIG. 4, a process 400 of recycling a payment vehicle is shown, according to an exemplary embodiment. Because the process 400 may be implemented with the card recycler system 200 of FIG. 2-3, reference may be made to various components of the card recycler system 200 and the financial institution computing system 208 to aid explanation of process 400. In general, steps or parts of steps that require physical interaction with a payment vehicle are carried out by a machine located at a location accessible to a customer or to a representative of a financial institution or other business, such as card recycler system 200 located at financial institution branch 202. Data processing, automation controls, and customer account-related tasks may be carried out by a computing system locally within the machine, remotely in a financial institution computing system, or any combination of the two.

At process 402, a payment vehicle is received by the card recycler system 200. For example, a payment vehicle may be inserted into input slot 320 by a customer, financial institution employee, or other user. To prompt a user to provide the payment vehicle to the card recycler system 200, the card recycler processing system 206 and/or the financial institution computing system 208 may provide a notification (e.g., an email, a text message, an alert in a smartphone application) indicating that the payment vehicle is damaged, out of date, compromised, or otherwise in need of an update, based on information provided to the card recycler processing system by the financial institution computing system 208 about the condition, age, status, or other compromising characteristic of the user's payment vehicle. For example, the financial institution computing system 208 might store information about the origination date of the user's current payment parts, such that when the current payment parts reach a certain age (e.g., the card reaches an expiration date), the card recycler processing system and/or the financial institution computing system sends a notification to the user instructing the user to update the payment parts. As another example, the financial institution computing system 208 might track a number of uses of a user's payment part or parts and compare that number of uses against a preset threshold associated with payment part degradation caused by overuse (e.g., as a magstripe generally accumulates damage after a large number of swipes through card readers), and send a notification to the user to replace the card after a predetermined number of uses because of predicted overuse damage. As mentioned above, the input slot may generate a signal to notify the card recycler processing system 206 that a payment vehicle has been received.

At process 404, the payment part or parts to be removed from the payment vehicle are determined. This determination may be based on sensor data collected by assessment sensors 326 and provided to the assessment and planning circuit 310. Sensor data may be processed and analyzed using any suitable approach by the assessment and planning circuit 310. Data processing may include identifying the location, age, physical condition, design, technology type, or other characteristics of the payment part or parts on the payment vehicle, as well as reading data stored on the payment parts. Assessment may include comparing these observed characteristics to a stored list of criteria that define which payment parts must be removed or scheduled for removal. For example, a rule dictating that a magstripe with an excess of a predefined number of detected scratches must be removed (e.g., 50 scratches). Assessment may also include comparing observed characteristics and data off the payment parts to the information accessed in the customer accounts database 210. For example, the customer accounts database 210 may indicate that payment parts should be replaced or reprogrammed because the customer account numbers they encode were electronically stolen by fraudsters, the length of time since the payment parts were issued exceeds a preset threshold, the model of payment part previously issued to the customer is no longer desirable (e.g., out-of-date), the customer has a pending order (e.g., online, in-person at a financial institution branch) for new payment parts, or an indication of a human-made decision that the payment parts should be removed was previously stored in the customer accounts database 210. Using these or other approaches, one or more payment part or parts are determined for removal. In some cases, the payment vehicle begins the process 400 blank (i.e., with no payment parts), and so process 404 may include deciding that no unwanted payment parts are present.

At process 406, the one or more unwanted payment parts are decoupled from the payment vehicle. As described above, decoupling may be achieved using a variety of tools, such as loosening implements 328 and removal mechanisms 330. In some embodiments, these tools are automated, for example under the control of automation controls circuit 314. Sensors may provide feedback on the progress of the tools in removing the unwanted payment part or parts, which may be used to generate updated controls instructions for the tools until the unwanted payment part or parts are fully removed.

At process 408, the new payment part or parts that will be installed with the payment vehicle are determined. The determination may be based on the physical characteristics of the payment vehicle as assessed in process 404. For example, the size and shape of the payment vehicle and/or receptacles on the payment vehicle configured to receive payment parts may have limited the options for the type of payment parts that can be added to the payment vehicle. The determination may also be based on information stored in the customer accounts database 210 indicating the payment parts ordered by a customer or assigned to a customer. In some cases, the customer accounts database 210 indicates that pre-ordered, pre-programmed payment parts are available for a specified customer. In other cases, the customer accounts database 210 indicates that the customer should receive a new payment part of a particular type, but not preprogrammed or preassigned to that customer. These payment parts are stored in payment parts inventory 336, and determining the payment parts for installation may include checking payment parts inventory 336 to see if the desired payment parts are currently available. In other embodiments, the customer is in possession of the new payment parts to be installed on the payment vehicle. In this instance, the card recycler system 200 prompts the customer to input the payment parts and accepts the payment parts via input slot 320.

At process 410, the new payment part or parts determined for installation are coupled to the payment vehicle. As mentioned above, the new payment parts may be fetched from the payment parts inventory 336 and affixed to the payment vehicle using coupling tools 334. Process 410 may also include the application of an adhesive, glue, cement, or other coupling means to secure the new payment part or parts to the payment vehicle. In some embodiments, coupling tools 334 are automated under control of the automation controls circuit 314, and provide feedback data to guide the closed-loop coupling process. Process 410 may also include waiting for a length of time required for a glue or other adhesive to cure.

At process 412, the new payment part or parts are associated with the customer account to recycle the payment vehicle. The association process varies based on the type of payment part and the initial data encoded on a payment part. In an embodiment where the new payment parts were pre-programmed for the user, associating the payment part or parts with the customer account includes reading data encoded on the payment parts and communicating with the customer account database to confirm that the new payment parts are encoded with the correct information. Where the new payment parts are generic, process 412 includes encoding customer account information on the payment parts. Magstripes, for example, can be encoded and/or reprogramed using a commercially-available magstripe writer. A chip is generally more difficult to reprogram, and may require an input of a decryption key before the chip's data storage can be altered. In such a case, process 412 requires communicating with the financial institution computing system 208 or with outside entities such as payment parts suppliers 212 to acquire the decryption key for the chip. The chip can then be programmed with the customer's account information stored in a standard binary format and conforming with payment parts standards set by one or more standards setting organizations. The chip may also be re-encrypted or locked. Other payment parts may be associated with the customer's account in suitable ways.

At process 414, the recycled payment vehicle is dispensed to the customer or other user. The dispensed payment vehicle may be ready for use or may require further steps to be activated for use. In some embodiments, the card recycler processing system 206 activates the payment vehicle for use by communicating with the customer accounts database to store an indication that the payment vehicle was issued to the customer. The indication may include information about the payment vehicle or the payment parts included with the payment vehicle to ensure that the customer accounts database has information associating the payment parts with the customer. In some embodiments, the interface generator circuit 316 may also transmit a user interface to the display 322 that prompts the user to follow certain steps to complete the card activation process including user input to the display 322. In some embodiments, the customer must log on to a website or app via a personal computer or mobile device to complete a card activation process, or must complete a card activation process over the phone or in person with a representative of the financial institution, for example at financial institution branch 202. In some embodiments, the accounts and programming circuit 312 may send a notification (e.g., email, text message, alert in an application) to the user detailing the steps necessary to activate the new payment part(s). In some embodiments, the printer 340 prints directions for the user to follow to activate the new payment part(s). Advantageously, dispensing the recycled payment vehicle directly to a verified customer via card recycler system 200 alleviates risks of lost or stolen payment vehicle shipments that conventional activation protocols are generally designed to mitigate.

Figure 5:
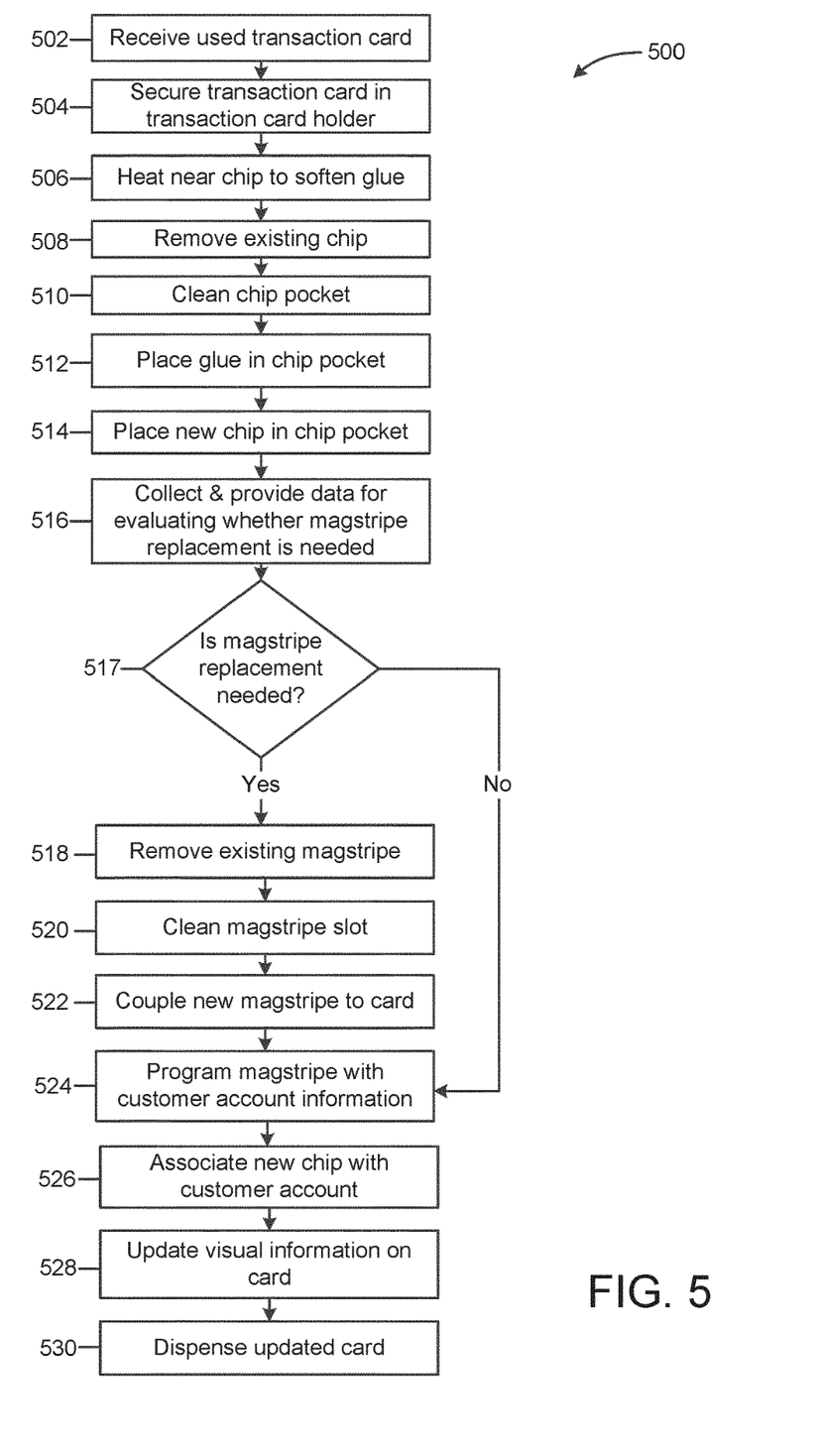
FIG. 5 is a flowchart of a process of recycling a payment vehicle via the card recycler mechanisms of the card recycler system of FIGS. 2-3, according to an example embodiment.

Referring now to FIG. 5, a process 500 of recycling a payment vehicle configured like transaction card 100 is shown, according to an example embodiment. The process 500 may be carried out by the card recycling mechanisms 204 of FIGS. 2-3, in response to controls, instructions, and information provided by the card recycler processing system 206 of FIGS. 2-3. Because the process 500 may be implemented with the card recycler system 200 of FIG. 2-3, reference may be made to various components of the card recycler system 200 and the financial institution computing system 208 to aid explanation of process 500.

At process 502, a used (e.g., old, damaged, in need of update) transaction card is received by the card recycler mechanisms 204. As mentioned above, the transaction card is received by input slot 320 configured to accept payment vehicles from users. Process 502 may also include accepting user input related to the inputted transaction card via display 322. To prompt a customer to provide a used transaction card to the card recycler mechanisms 204, the card recycler processing system 206 and/or the financial institution computing system 208 may provide a notification to a customer that the customer's transaction card is old, damaged, compromised, or otherwise in need of an update. This notification may be provided to the customer via a smartphone or tablet application, in an email or text message, or any other suitable format. Alternatively, a user's device (e.g., smartphone, tablet, etc.) may be detected by the card recycler processing system 206 (e.g., via interface generator circuit). Based on the detection, information regarding the user's device can be sent or transmitted to the financial institution computing system 208. The user's device information may correlated with information in the database 210 to determine if the person's payment parts are due for replacement. If determine that they are due for a replacement, a notification (e.g., text message, phone call, etc.) may be provided to the user to prompt them to provide their transaction card to the slot for recycling of the transaction card.

At process 504, the transaction card is secured in a transaction card holder, such as card holder 324. The transaction card may be secured in a single location within the card recycler system 200 as other card recycler mechanisms 204 are actuated to reach the transaction card, or the transaction card may be periodically relocated or reoriented by the card holder 324 to carry out process 500.

At process 506, an area of the transaction card near the chip is heated to soften the glue that couples the chip to the transaction card. The heat originates from loosening implements 328, operating under control of the automation controls circuit 314. In some embodiments, the entire payment vehicle is heated to loosen all payment parts. The heating of process 506 renders the bond between the chip and the transaction card relatively weak, such that the chip can be removed from the transaction card in process 508.

At process 508, the chip is removed from the transaction card using, for example, removal mechanisms 330 under the control of automation controls circuit 314. A chip pocket is revealed in the volume formerly occupied by the chip. At process 510, the chip pocket is cleaned to prepare the transaction card to receive and be coupled to a new chip. Cleaning may be carried out by cleaning implements 332 under the control of automation controls circuit 314. At process 512, glue is placed in the chip pocket to further prepare the transaction card to be coupled to a new chip. Process 512 may be carried out by coupling tools 334 under the control of automation controls circuit 314.

At process 514, a new chip is placed in the chip pocket to be held in place by the glue. Process 514 is carried out by coupling tools 334 under the control of automation controls circuit 314. Process 514 may include fetching the new chip from the payment parts inventory 336. Process 514 may also include waiting for a prescribed time period after chip placement to allow the glue to cure, and may include holding the chip in the correct position on the transaction card during that prescribed time period. A new chip is thereby installed on the transaction card.

At process 516, the card recycling mechanisms collect data related to determining whether the magstripe on the transaction card must be replaced, and provide the data to the card recycler processing system. The data may include the information encoded on the magstripe, the strength of the magnetic polarizations on the magstripe, and images of the magstripe potentially showing scratches or other damage, among other suitable data. In decision 517, the card recycler processing system 206 determines whether or not the magstripe must be replaced based on this data. The acquired data may be compared to a look-up table of rules stored in the assessment and planning circuit 310, for example that a magstripe must be replaced if the strength or stability of the magnetic polarizations on the magstripe is below a preset threshold. The decision may also be made using a probabilistic artificial intelligence approach to autonomously reach conclusions about the condition of a magstripe based on the available data.

If the card recycler processing system 206 determines that the magstripe must be replaced, then the mechanisms receive controls signals to remove the existing magstripe in process 518. The removal of the magstripe in process 518 is carried out by removal mechanisms 330 under the control of automation controls circuit 314. In some embodiments, process 518 also includes the loosening of the magstripe by loosening implements 328. After the magstripe is removed, the area previously occupied by the magstripe is cleaned in process 520 to prepare the transaction instrument to receive a new magstripe. Process 520 is carried out by cleaning implements 332 under the control of automation controls circuit 314. A new magstripe is then coupled to the payment vehicle in process 522. Process 522 includes fetching the new magstripe from the payment parts inventory 336. Process 522 is carried out by coupling tools 334 under the control of automation controls circuit 314.

If the card recycler processing system 206 determines that the existing magstripe is sufficient in decision 517, the system skips to process 524 where the magstripe is reprogrammed with updated customer account information. In the case where a new magstripe was installed, process 524 includes programing the new magstripe with customer account information. Customer account information may be supplied to the card reader and writer 338 from the customer accounts database 210 via accounts and programming circuit 312. The card reader and writer 338 may then encode the customer account information on the magstripe under the control of the automation controls circuit 314.

At process 526, the new chip is also associated with the customer account. Process 526 may include reprogramming the chip to store the customer account information provided to the card reader and writer 338 by the accounts and programming circuit 312. Process 526 may also involve unlocking the chip's security features or decrypting the data stored on the chip, for example by using a decryption key provided by to the card reader and writer 338 by the accounts and programming circuit 312.

In some embodiments, visual information printed on the card is also be updated at process 528. For example, printer 340 may be controlled to print a new card number, card verification value, expiration date, or cardholder name directly on the transaction instrument. In other embodiments, printer 340 prints a sticker to be adhered to the transaction instrument or sheet of paper to be provided to the user with any updated customer information traditionally presented on a transaction card. Printer 340 receives the relevant customer information from accounts and programming circuit 312. At process 530, the updated transaction card is dispensed to a user, for example by using dispenser 342.

In some embodiments, some or all of the card number 106, expiration date 108, CVV 110, and cardholder name 112 as shown in FIG. 1 are interchangeable and replaceable in an analogous manner as the chip. For example, if the payment vehicle is shaped like a card and is made out of sterling silver, the elements 106-112 are created in a matching sterling inset, and affixed and/or removed the way the chip is (i.e., as described herein in reference to removing/installing a chip). This allows for card number updates, transfer of the instrument body to someone else, etc. Or, the elements may be printed on an attractive laminate (either matching the instrument body or providing attractive contrast, or clear) that can be removed by the removal method/device described herein. In some cases, for example for business use, a company name on the payment vehicle may be permanent while the cardholder name is removable. This is an advantageous configuration because business transaction card may then be reusable with multiple different employees, which takes into consideration the fact that employees leave the business, take on different roles that no longer require them to have the business transaction card, and a myriad of other circumstances.

Figure 6:
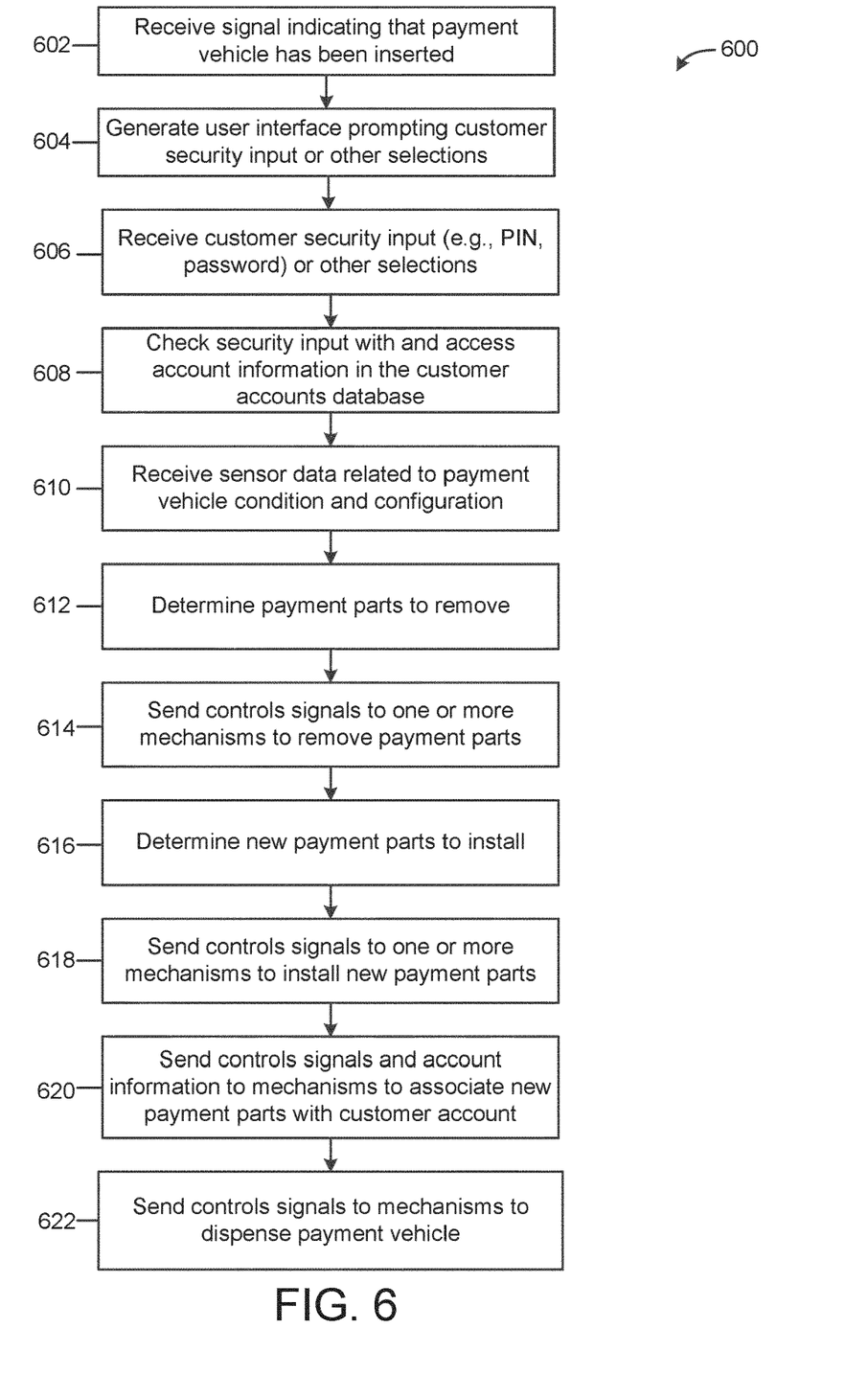
FIG. 6 is a flowchart of a process of recycling a payment vehicle via the card recycler processing system of the card recycler system of FIGS. 2-3, according to an example embodiment.

Referring now to FIG. 6, a process 600 for recycling a payment vehicle is shown, according to an example embodiment. Process 600 may be performed by the card recycler processing system 206 as shown in FIGS. 2-3 and operated within the card recycler system 200, in a financial institution computing system 208, or in some combination of the two. Because the process 600 may be implemented with the card recycler system 200 of FIG. 2-3, reference may be made to various components of the card recycler system 200 and the financial institution computing system 208 to aid explanation of process 600. Performing process 600 using card recycler processing system 206 may involve receiving data from and sending signals to card recycler mechanisms 204 via network interface 318.

At process 602, the card recycler processing system 206 receives a signal indicating that a payment vehicle has been inserted into the card recycler system 200. In response, a user interface is generated at process 604. The user interface prompts a customer for a security input, for example a personal identification number (PIN) or a password, or for other input, options, or instructions via display 322. The display 322 may receive such input from a customer, and transmit a signal comprising the user input to the card recycler processing system 206. At process 606, the user input is received by the card recycler processing system 206. The user's inputted security information is checked against the customer account information in the customer accounts database 210 by accounts and programming circuit 312 in process 608. Process 608 may include any suitable cybersecurity technique to use the customer's input to gain access to customer account information in the customer's account database.

At process 610, the card recycler processing system requests and receives sensor data from the card recycler mechanisms 204 related to the condition and configuration of the payment vehicle. Sensor data may be provided to the assessment and planning circuit 310 and may include information useful in identifying the location, age, physical condition, design, technology type, or other observable characteristics of payment parts on the payment vehicle.

At process 612, sensor data, as well as customer account information and/or other relevant information is used to determine which payment parts must be removed from the payment vehicle. Other relevant information may include a list of criteria defining which observed characteristics of a payment part determine whether or not it must be removed, can be reprogrammed, or may be left as-is. The list of criteria may be stored in memory 302 or in assessment and planning circuit 310. Any suitable means of analysis may be used to make determinations about payment part removal, including machine learning, neural networks, and other artificial intelligence approaches.

At process 614, control signals are sent to the card recycler mechanisms 204 to effect the removal of payment parts. Control signals may be formulated and transmitted by automation controls circuit 314 to carry out a plan generated by assessment and planning circuit 310. In some embodiments, process 614 also includes receiving feedback signals from the card recycler mechanisms 204 and updating control signals in response to ensure full removal of the payment parts determined for removal. In some cases, the payment vehicle as inserted by a user does not contain any payment parts, in which case process 614 is skipped.

At process 618, the card recycler processing system also determines which new payment parts must be installed. The assessment and planning circuit 310 determines the payment part types that a payment vehicle is configured to receive based on sensor data from the card recycler mechanisms 204. The accounts and programming circuit 312 accesses the customer accounts database 210 to retrieve any information related to payments parts ordered by a customer or assigned for a customer, or other payment-parts related instructions stored in the customer accounts database 210. The assessment and planning circuit 310 uses some or all of this or other relevant information to select which payment parts should be added to the payment vehicle.

At process 618, control signals are sent to the card recycler mechanisms 204 to effect the installation of new payment parts. Control signals include instructions to payment parts inventory 336 to provide the selected payment parts to the coupling tools 334. Control signals also include instructions to the coupling tools 334 to effect the coupling of the new selected payment parts to the payment vehicle. In some embodiments, process 518 may also include receiving feedback signals from the coupling tools 334 and updating the control signals in response to ensure proper installation of the payment parts on the payment vehicle.

At process 620, control signals and relevant customer account information may be sent to the card recycler mechanisms 204 to effect the association of the new payment parts with the customer account. For example, the card recycler processing system 206 may instruct the card reader and writer 338 to reprogram the payment parts to store the customer account information and provide the necessary account information to card reader and writer 338. Process 620 may include unlocking or decrypting data stored on a payment part using a security key, altering that data, and relocking or encrypting the data. In some embodiments, the card recycler processing system 206 receives payment part identification data from the card reader and writer 338 and stores the payment part identification data in the customer's account in the customer accounts database 210. Process 620 may also include activating the new payment part to be used immediately by a customer.

After the new payment parts have been associated with the customer account, control signals are sent to dispense the payment vehicle to the user in process 622. Process 600 thereby returns the payment vehicle to the customer with new or updated payment parts. The payment vehicle may be ready for use (e.g., activated in process 620 as mentioned above), or may require a customer to take further steps to activate the new or updated payment parts.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

For the purpose of this disclosure, the terms "coupled" or "couple" means the joining of two members directly or indirectly to one another. For example and for the purposes of this disclosure, component A may be referred to as being "coupled" to component B even if component C is an intermediary, such that component A is not directly connected to component B. On the other hand and for the purposes of this disclosure, component A may be considered "coupled" to component B if component A is directly connected to component B (e.g., no intermediary). Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature. This definition is not limited to physical connections. Rather and similarly, the terms "couple" or "coupled" have an analogous definition and interpretation with respect to communications and electrical attachments/connections. In this regard, component A may be referred to as being "coupled" to component B even if component C is an intermediary, and component A exchanges information with component B (e.g., data, commands, values, signals, etc.) via component C. Thus and in this example, there may or may not be a direct physical connection (e.g., an electrical connection) between component A and component B; yet, for the purposes of this disclosure, these components are still considered "coupled."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of updating a payment card at a card recycler system comprising a sensor, user interface, removal mechanism, processing circuit, coupling tool, card writer, payment parts inventory and dispenser, the method comprising:
    storing, by the card recycler system, a plurality of payment parts in the payment parts inventory;
    receiving, in the card recycler system, the payment card of a user, wherein the payment card includes a payment part, and the payment part is one of: a magstripe or an integrated circuit chip;
    obtaining, by the sensor, account data of the user from the payment part and physical characteristics of the payment part;
    receiving, by the user interface, a security input from the user;
    identifying, by the processing circuit, an account of the user in a database using the security input and the account data;
    verifying, by the processing circuit, the security input based on the account;
    obtaining, by the processing circuit, based on the physical characteristics of the payment part and the account, a first replacement payment part from the plurality of payment parts stored in the payment parts inventory, wherein the first replacement payment part comprises encrypted data and is one of: a replacement magstripe or a replacement integrated circuit chip;
    removing, by the removal mechanism, the payment part from the payment card;
    installing, by the coupling tool, the first replacement payment part in the payment card;
    decrypting, by the card writer, the encrypted data from the first replacement payment part using a decrypting key;
    updating, by the card writer, the decrypted data based on the account;
    re-encrypting, by the card writer, the updated decrypted data using an encryption key; and
    dispensing, by the dispenser, the payment card.

2. The method of claim 1, wherein removing the payment part from the payment card comprises heating the payment card proximate the payment part, gripping the payment part, and separating the existing payment part from the payment card.

3. The method of claim 2, wherein installing the first replacement payment part in the payment card comprises applying an adhesive to the payment card and placing the first replacement payment part on the adhesive.

4. A card recycler system comprising:
    a processing circuit, sensor, user interface, slot, card writer, dispenser, payment parts inventory storing a plurality of payment parts, removal mechanism, coupling tool, and memory storing executable instructions that when executed by the processing circuit causes the processing circuit to perform steps of:

receiving, via the slot, a payment card of a user, wherein the payment card includes a payment part, and the payment part is one of: a magstripe or an integrated circuit chip;

obtaining, via the sensor, account data of the user from the payment part and physical characteristics of the payment part;

receiving, via the user interface, a security input from the user;

identifying an account of the user in a database using the security input and the account data;

verifying the security input based on the account;

obtaining based on the physical characteristics of the payment part and the account, a first replacement payment part from the plurality of payment parts stored in the payment parts inventory, wherein the first replacement payment part, comprises encrypted data, and is one of: a replacement magstripe or a replacement integrated circuit chip;

removing, via the removal mechanism, the payment part from the payment card;

installing, via the coupling tool, the first replacement payment part in the payment card;

decrypting, via the card writer, the encrypted data from the first replacement payment part using a decrypting key;

updating, via the card writer, the decrypted data with the account data;

re-encrypting, via the card writer, the updated decrypted data using an encryption key; and dispensing, via the dispenser, the payment card.

5. The card recycler system of claim 4, the steps further comprising displaying, via the user interface, a status of the payment card.

* * * * *